(12) United States Patent
Tabata et al.

(10) Patent No.: US 11,614,131 B2
(45) Date of Patent: Mar. 28, 2023

(54) APPARATUS, SYSTEM, AND VEHICLE CONTROL APPARATUS

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Kota Fujii, Nissin (JP); Ken Imamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/370,632

(22) Filed: Jul. 8, 2021

(65) Prior Publication Data

US 2022/0042557 A1 Feb. 10, 2022

(30) Foreign Application Priority Data

Aug. 6, 2020 (JP) .............................. JP2020-133952

(51) Int. Cl.
*F16D 48/06* (2006.01)
*F16D 25/0638* (2006.01)

(52) U.S. Cl.
CPC ....... *F16D 48/062* (2013.01); *F16D 25/0638* (2013.01); *F16D 2500/1045* (2013.01); *F16D 2500/10412* (2013.01); *F16D 2500/3024* (2013.01); *F16D 2500/3026* (2013.01); *F16D 2500/3065* (2013.01); *F16D 2500/30803* (2013.01); *F16D 2500/30806* (2013.01); *F16D 2500/5023* (2013.01); *F16D 2500/50296* (2013.01); *F16D 2500/7041* (2013.01); *F16D 2500/70217* (2013.01)

(58) Field of Classification Search
None
See application file for complete search history.

(56) References Cited

U.S. PATENT DOCUMENTS

| 9,771,064 | B2 * | 9/2017 | Nefcy | ................... B60W 20/40 |
| 2008/0318727 | A1 * | 12/2008 | Matsubara | .......... F16H 61/0437 |
| | | | | 477/3 |
| 2021/0018056 | A1 * | 1/2021 | Baker | ..................... F16D 48/06 |

FOREIGN PATENT DOCUMENTS

JP  2018-053947 A  4/2018

* cited by examiner

*Primary Examiner* — Timothy Hannon
(74) *Attorney, Agent, or Firm* — Oliff PLC

(57) ABSTRACT

An apparatus to be applied to a vehicle including a transmission configured to execute a gear shifting operation for changing a gear ratio by engaging or disengaging friction engagement elements having friction members pushed by a piston that moves through hydraulic pressure supply to an oil chamber, the apparatus including: a memory storing mapping data for defining mapping, the mapping including a pressure variable and a period variable as input variables, the mapping including a stroke amount as an output variable, the pressure variable indicating a waiting pressure, the period variable indicating a waiting period; and a processor configured to: acquire values of the input variables, and calculate a value of the output variable by inputting, to the mapping, the acquired values of the input variables.

11 Claims, 9 Drawing Sheets

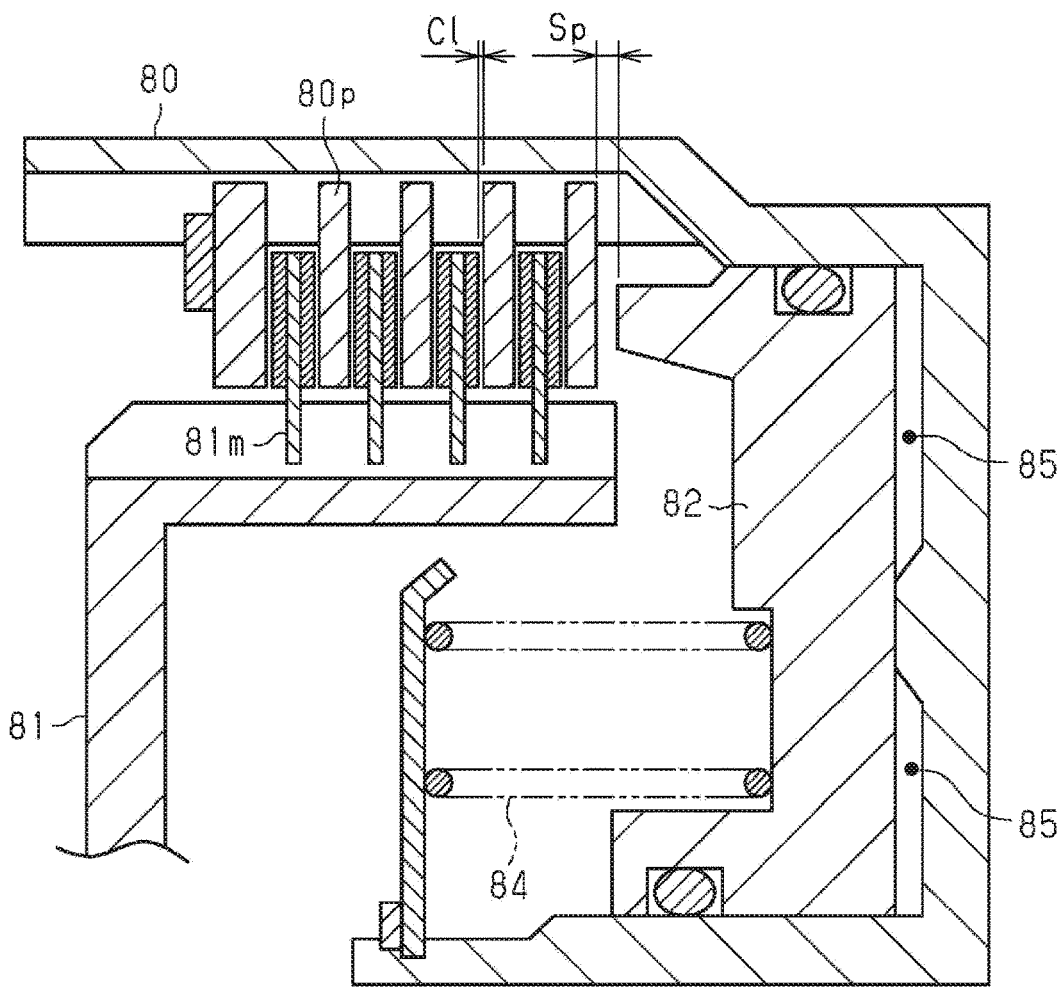

APPARATUS, SYSTEM, AND VEHICLE CONTROL APPARATUS

CROSS-REFERENCE TO RELATED APPLICATION

This application claims priority to Japanese Patent Application No. 2020-133952 filed on Aug. 6, 2020, incorporated herein by reference in its entirety.

BACKGROUND

1. Technical Field

The present disclosure relates to an apparatus, a system, and a vehicle control apparatus.

2. Description of Related Art

Japanese Unexamined Patent Application Publication No. 2018-53947 (JP 2018-53947 A) describes an apparatus configured to estimate a wear amount of a friction member of a friction engagement element.

SUMMARY

In the friction engagement element, for example, the wear amount of the friction member can be grasped when the stroke amount of a piston that pushes the friction member can be grasped. Therefore, there is a demand to grasp the stroke amount.

A first aspect of the disclosure relates to an apparatus to be applied to a vehicle including a transmission configured to execute a gear shifting operation for changing a gear ratio between an on-board prime mover and a driving wheel by engaging or disengaging friction engagement elements having friction members pushed by a piston that moves through hydraulic pressure supply to an oil chamber, the apparatus comprising: a memory storing mapping data for defining mapping, the mapping including a pressure variable and a period variable as input variables, the mapping including a stroke amount as an output variable, the pressure variable indicating a waiting pressure, the period variable indicating a waiting period, a hydraulic pressure supplied to the oil chamber for pack filling to bring the disengaged friction engagement elements into a state immediately before engagement being defined as the waiting pressure, a movement amount of the piston during a period from the hydraulic pressure supply to the oil chamber to completion of the pack filling is defined as the stroke amount of the piston, the period required from the hydraulic pressure supply to the oil chamber to the completion of the pack filling is defined as the waiting period; and a processor configured to: acquire values of the input variables, and calculate a value of the output variable by inputting, to the mapping, the acquired values of the input variables.

The stroke amount of the piston increases as the friction member of the friction engagement element is worn. The stroke amount is correlated to the waiting period. The waiting period changes depending on the waiting pressure as well as the stroke amount. In this configuration, the stroke amount is calculated based on the waiting period and the waiting pressure that are related to the stroke amount. Therefore, the stroke amount of the piston can be estimated accurately.

In the above aspect, the input variables may include an oil temperature variable indicating a temperature of hydraulic oil supplied to the oil chamber. When the temperature of the hydraulic oil changes, the fluidity of the hydraulic oil or the like changes and the moving speed of the piston changes. Therefore, the waiting period changes depending on the temperature of the hydraulic oil as well as the stroke amount. In this configuration, the input variables include the oil temperature variable. Therefore, the stroke amount is calculated in consideration of influence on the waiting period from the temperature of the hydraulic oil. Thus, the stroke amount can be calculated with higher accuracy than that in a case where the input variables do not include the oil temperature variable.

In the above aspect, the waiting pressure may be a pressure to be changed to increase as an output torque of the on-board prime mover increases; and the input variables may include a torque variable indicating the output torque.

According to this configuration, when the output torque of the on-board prime mover is large, for example, in a situation in which quick acceleration is requested, the waiting pressure is increased, and therefore the waiting period is shortened. Since the period required for gear shifting is shortened, quick gear shifting can be achieved. When the waiting pressure is variably set based on the output torque, the waiting period changes depending on the output torque as well as the stroke amount. In this configuration, the input variables include the torque variable. Therefore, the stroke amount is calculated in consideration of influence on the waiting period from the change in the waiting pressure caused by the output torque. Thus, the stroke amount can be calculated with higher accuracy than that in a case where the input variables do not include the torque variable.

In the above aspect, the transmission may include a plurality of the friction engagement elements; and the input variables may include a gear shifting variable indicating the friction engagement elements engaged in gear shifting.

According to this configuration, the input variables include the gear shifting variable. Therefore, the stroke amount of the friction engagement element engaged in the gear shifting can be calculated accurately. In the above aspect, a period from the hydraulic pressure supply to the oil chamber to a start of an inertia phase in a process of gear shifting may be acquired as the period variable.

At the time of completion of the pack filling after the start of the gear shifting, great changes are unlikely to appear in, for example, a rotation speed of an input shaft of the transmission and an output torque of an output shaft of the transmission. Therefore, it is difficult to detect the completion of the pack filling based on the changes in the input shaft rotation speed and the output torque. When the inertia phase is started in the process of the gear shifting, the input shaft rotation speed of the transmission changes greatly. Therefore, the start timing of the inertia phase can be detected easily. When the waiting period increases, the start timing of the inertia phase is shifted later. That is, the waiting period is correlated to the period from the hydraulic pressure supply to the oil chamber to the start of the inertia phase in the process of the gear shifting. In this configuration, the period from the hydraulic pressure supply to the oil chamber to the start of the inertia phase in the process of the gear shifting is acquired as the period variable indicating the waiting period. Thus, the period variable can be acquired easily and securely.

In the above aspect, the processor may be configured to calculate a wear amount of the friction members by subtracting an initial value of the stroke amount from the stroke amount calculated by the processor.

According to this configuration, the wear amount of the friction member can be calculated. Examples of the initial value of the stroke amount include a stroke amount calculated when the calculation process is executed for the first time, and a design stroke amount of the friction engagement element in a brand new condition.

In the above aspect, the processor may be configured to reduce wear of the friction members when the stroke amount calculated by the processor is larger than a reference stroke amount calculated based on a total traveling distance of the vehicle.

The wear amount of the friction member of the friction engagement element increases as the total traveling distance of the vehicle increases. Therefore, the stroke amount of the piston tends to increase as well. In this configuration, the addressing process is executed when the stroke amount calculated through the calculation process is larger than the reference stroke amount calculated based on the total traveling distance of the vehicle. Accordingly, it is possible to reduce the occurrence of, for example, a case where the friction member of the friction engagement element reaches its serviceability limit at an early stage. Examples of the addressing process include a process for shortening an engagement period of the friction engagement element.

A second aspect of the disclosure relates to a system including: a memory storing mapping data for defining mapping, the mapping including a pressure variable and a period variable as input variables, the mapping including a stroke amount as an output variable, the pressure variable indicating a waiting pressure, the period variable indicating a waiting period, in a vehicle including a transmission configured to execute a gear shifting operation for changing a gear ratio between an on-board prime mover and a driving wheel by engaging or disengaging friction engagement elements having friction members pushed by a piston that moves through hydraulic pressure supply to an oil chamber, a hydraulic pressure supplied to the oil chamber for pack filling to bring the disengaged friction engagement elements into a state immediately before engagement being defined as the waiting pressure, a movement amount of the piston during a period from the hydraulic pressure supply to the oil chamber to completion of the pack filling is defined as the stroke amount of the piston, the period required from the hydraulic pressure supply to the oil chamber to the completion of the pack filling is defined as the waiting period; a first processor provided in the vehicle; and a second processor provided outside the vehicle, wherein: the first processor is configured to: acquire values of the input variables, transmit acquired data, and receive a result of calculation from the second processor; and the second processor is configured to: receive data transmitted by the first processor, calculate, as the result of calculation, a value of the output variable by inputting, to the mapping, the acquired values of the input variables, and transmit the result of calculation.

In this configuration, the second processor executes the calculation process. Thus, a calculation load on the first processor can be reduced as compared to a case where the first processor executes the calculation process. A third aspect of the disclosure relates to a vehicle control apparatus comprising the first processor of the system according to the above second aspect.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a sectional view of a friction engagement element of the first embodiment;

FIG. 3 is an explanatory drawing illustrating relationships between gear stages of an automatic transmission and the friction engagement elements according to the first embodiment;

DETAILED DESCRIPTION OF EMBODIMENTS

First Embodiment

A first embodiment is described below with reference to FIG. 1 to FIG. 7.

Figure 1:
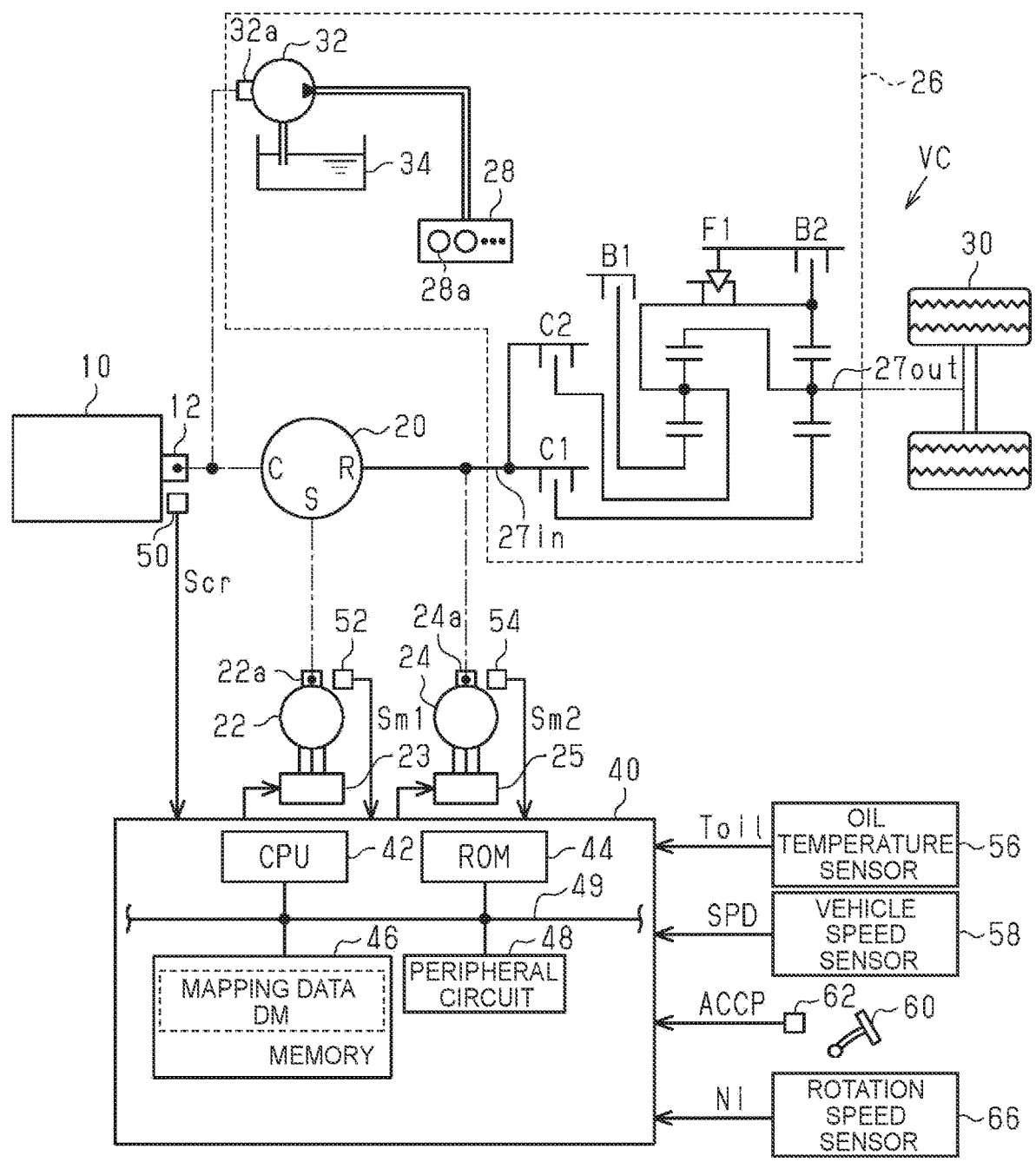
FIG. 1 is a diagram illustrating the configuration of a drive system and a control apparatus for a vehicle according to a first embodiment.

As illustrated in FIG. 1, a power split device 20 is mechanically coupled to a crankshaft 12 of an internal combustion engine 10 of a vehicle VC. The power split device 20 splits power of the internal combustion engine 10, a first motor generator 22, and a second motor generator 24. The power split device 20 includes a planetary gearing mechanism. The crankshaft 12 is mechanically coupled to a carrier C of the planetary gearing mechanism. A rotational shaft 22a of the first motor generator 22 is mechanically coupled to a sun gear S of the planetary gearing mechanism. A rotational shaft 24a of the second motor generator 24 and an input shaft 27in of an automatic transmission 26 are mechanically coupled to a ring gear R of the planetary gearing mechanism. An output voltage of a first inverter 23 is applied to a terminal of the first motor generator 22. An output voltage of a second inverter 25 is applied to a terminal of the second motor generator 24.

The automatic transmission 26 is a multi-stage transmission including a plurality of friction engagement elements such as a first clutch C1, a second clutch C2, a first brake B1, and a second brake B2, a plurality of planetary gearing mechanisms, and a one-way clutch F1. The basic structures of the friction engagement elements are substantially the same and are known well.

FIG. 2 schematically illustrates the structure of the first clutch C1 as an example. As illustrated in FIG. 2, the first clutch C1 includes a first member 80 and a second member 81 configured to rotate relative to each other about the same central axis of rotation, and a piston 82 configured to engage and disengage the first clutch C1.

A plurality of spline-coupled first plates 80p is juxtaposed on the inner periphery of the first member 80. A plurality of spline-coupled second plates 81m is juxtaposed on the outer periphery of the second member 81. Each second plate 81m has friction members. The first plates 80p and the second plates 81m are arranged alternately.

An oil chamber 85 is formed between the first member 80 and the piston 82. The piston 82 is pushed toward the oil chamber 85 by a spring 84. In a state in which no hydraulic pressure is supplied to the oil chamber 85, a space Sp is defined between the distal end of the piston 82 and the first plate 80p facing the distal end. Therefore, the first clutch C1 is disengaged.

When the hydraulic pressure is supplied to the oil chamber 85, the piston 82 approaches the first plate 80p to abut against the first plate 80p. After abutting against the first plate 80p, the piston 82 pushes the first plate 80p to eliminate clearances C1 between the first plates 80p and the second plates 81m. Therefore, the first clutch C1 is brought into a state immediately before engagement, that is, a pack-filled state. In the present application, adjustment of pack clearance such as the clearances C1 between the first plates 80p and the second plates 81m in a friction engagement element such as the first clutch C1 is referred to as "pack-filling". When the piston 82 further pushes the first plate 80p after the pack filling is completed, the relative rotation speed between the first plates 80p and the second plates 81m gradually decreases, and the torque capacity of the first clutch C1 increases. Lastly, the relative rotation speed between the first plates 80p and the second plates 81m is "0". Therefore, the first clutch C1 is completely engaged. The structure of the second clutch C2 is substantially the same as the structure of the first clutch C1. The structures of the first brake B1 and the second brake B2 are basically similar to the structure of the first clutch C1 except that the first member 80 does not rotate but is fixed to, for example, a housing of the automatic transmission 26.

A movement amount of the piston 82 during a period from the hydraulic pressure supply to the oil chamber 85 to the completion of the pack filling is hereinafter referred to as "stroke amount ST" of the piston 82. The stroke amount ST is equal to the sum of the space Sp and the total of all the clearances C1 between the first plates 80p and the second plates 81m.

A hydraulic pressure supplied to the oil chamber 85 for the pack filling of the disengaged friction engagement element is hereinafter referred to as "waiting pressure Pw". A period required from the hydraulic pressure supply to the oil chamber 85 to the completion of the pack filling is hereinafter referred to as "waiting period Tw".

As illustrated in FIG. 3, gear stages of the automatic transmission 26 are switched based on combinations of engaged states and disengaged states of the first clutch C1, the second clutch C2, the first brake B1, and the second brake B2 and a combination of a rotation restricting state and a rotation permitting state of the one-way clutch F1. The automatic transmission 26 can make a total of five gear stages including four gear stages that are "first gear" to "fourth gear" for forward traveling and "reverse gear" for reverse traveling.

In FIG. 3, circles represent the engaged state of the friction engagement element such as the first clutch C1, and the rotation restricting state of the one-way clutch F1. A blank field represents the disengaged state of the friction engagement element such as the first clutch C1, and the rotation permitting state of the one-way clutch F1. For example, when the gear stage of the automatic transmission 26 is second gear, the first clutch C1 and the first brake B1 are engaged, the second clutch C2 and the second brake B2 are disengaged, and the one-way clutch F1 permits rotation. The circle within parentheses representing a state of the second brake B2 at "first gear" indicates that the second brake B2 is substantially engaged irrespective of the status of hydraulic pressure supply when the one-way clutch F1 is engaged.

In FIG. 1, driving wheels 30 are mechanically coupled to an output shaft 27out of the automatic transmission 26. A driven shaft 32a of an oil pump 32 is mechanically coupled to the carrier C. The oil pump 32 circulates oil in an oil pan 34 through the power split device 20 as lubricating oil, and supplies the oil to the automatic transmission 26 as hydraulic oil. A hydraulic control circuit 28 in the automatic transmission 26 adjusts a pressure of the hydraulic oil ejected from the oil pump 32, and the hydraulic oil is used as, for example, hydraulic oil for supplying a hydraulic pressure to the oil chamber 85. The hydraulic control circuit 28 includes a plurality of solenoid valves 28a, and controls a flowing state and a hydraulic pressure of the hydraulic oil by energizing the solenoid valves 28a.

A control apparatus 40 controls the internal combustion engine 10, and operates various operation portions of the internal combustion engine 10 to control, for example, a torque and an exhaust gas component ratio that are control amounts. The control apparatus 40 controls the first motor generator 22, and operates the first inverter 23 to control, for example, a torque and a rotation speed that are control amounts. The control apparatus 40 controls the second motor generator 24, and operates the second inverter 25 to control, for example, a torque and a rotation speed that are control amounts.

To control the control amounts, the control apparatus 40 refers to an output signal Scr from a crank angle sensor 50, an output signal Sm1 from a first rotation angle sensor 52, and an output signal Sm2 from a second rotation angle sensor 54. The first rotation angle sensor 52 detects a rotation angle of the rotational shaft 22a of the first motor generator 22. The second rotation angle sensor 54 detects a rotation angle of the rotational shaft 24a of the second motor generator 24. The control apparatus 40 also refers to an oil temperature Toil that is a temperature of the hydraulic oil detected by an oil temperature sensor 56, a vehicle speed SPD detected by a vehicle speed sensor 58, and an accelerator operation amount ACCP that is an amount of depression of an accelerator pedal 60 detected by an accelerator sensor 62. The control apparatus 40 also refers to an input shaft rotation speed Ni that is a rotation speed of the input shaft 27in detected by a rotation speed sensor 66.

The control apparatus 40 includes a central processing unit (CPU) 42, a read-only memory (ROM) 44, a memory 46 that is an electrically rewritable non-volatile memory, and a peripheral circuit 48, which are communicable with each other via a local network 49. The peripheral circuit 48 includes a circuit configured to generate a clock signal for defining internal operations, a power supply circuit, and a reset circuit. The control apparatus 40 controls the control amounts such that the CPU 42 executes programs stored in the ROM 44. The CPU 42 and the ROM 44 serve as a processor.

Figure 4:
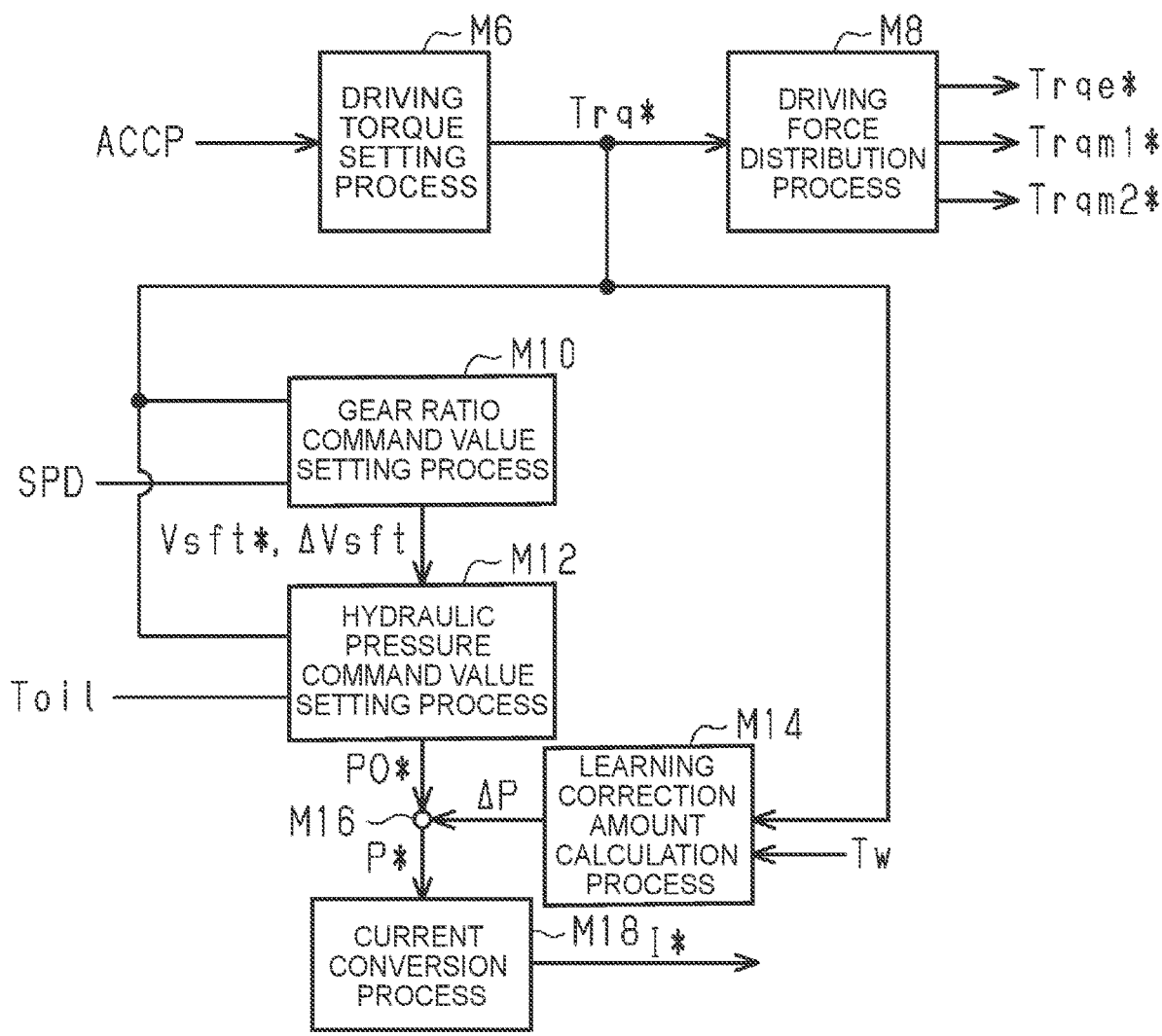
FIG. 4 is a block diagram illustrating processes to be executed by the control apparatus according to the first embodiment.

FIG. 4 illustrates a part of processes to be executed by the control apparatus 40. The processes illustrated in FIG. 4 are implemented such that the CPU 42 repeatedly executes the programs stored in the ROM 44 in, for example, every predetermined period.

In a driving torque setting process M6, the accelerator operation amount ACCP is input. When the accelerator operation amount ACCP is large, a driving torque command value Trq* is calculated as a larger value than the value when the accelerator operation amount ACCP is small. The driving torque command value Trq* is a command value of a torque to be applied to the driving wheels 30.

In a driving force distribution process M8, a torque command value Trqe* for the internal combustion engine 10, a torque command value Trqm1* for the first motor generator 22, and a torque command value Trqm2* for the second motor generator 24 are set based on the driving torque command value Trq*. When the internal combustion engine 10, the first motor generator 22, and the second motor generator 24 generate torques corresponding to the torque command values Trqe*, Trqm1*, and Trqm2*, respectively, the torque to be applied to the driving wheels 30 has a value corresponding to the driving torque command value Trq*.

In a gear ratio command value setting process M10, a gear ratio command value Vsft* and a shifting variable ΔVsft are set based on the driving torque command value Trq* and the vehicle speed SPD. The gear ratio command value Vsft* is a command value of a gear ratio of the automatic transmission 26. The shifting variable ΔVsft indicates whether the gear ratio is shifted up or down. When the gear ratio command value Vsft* indicates third gear and the shifting variable ΔVsft indicates upshift, it is understood that the type of gear shifting is shifting from third gear to fourth gear and the disengaged first brake B1 is engaged through this gear shifting. The gear ratio command value Vsft* and the shifting variable ΔVsft are gear shifting variables indicating a friction engagement element engaged in the gear shifting.

In a hydraulic pressure command value setting process M12, a hydraulic pressure command value P0* is set based on the driving torque command value Trq*, the oil temperature Toil, the gear ratio command value Vsft*, and the shifting variable ΔVsft when shifting the gear ratio. The hydraulic pressure command value P0* is a base value of a command value of the hydraulic pressure to be adjusted by the solenoid valves for use in the shifting. The hydraulic pressure command value setting process M12 is implemented such that the CPU 42 calculates the hydraulic pressure command value P0* based on a map in a state in which map data whose input variables are the driving torque command value Trq*, the gear ratio command value Vsft*, the shifting variable ΔVsft, and the oil temperature Toil and whose output variable is the hydraulic pressure command value P0* is prestored in the ROM 44.

In a learning correction amount calculation process M14, a correction amount ΔP for correcting the hydraulic pressure command value P0* is calculated based on the driving torque command value Trq* and the waiting period Tw. In this embodiment, the waiting pressure Pw undergoes feedback control so that the waiting period Tw reaches a predetermined specified period Twref. A correction amount of the waiting pressure Pw in the feedback control is one value constituting the correction amount ΔP. When the driving torque command value Trq* is large, for example, in a situation in which quick acceleration is requested, the waiting period Tw is shortened by increasing the waiting pressure Pw. Since the period required for the gear shifting is shortened, quick gear shifting can be achieved. Thus, when the driving torque command value Trq* is large, the correction amount ΔP is calculated to increase the waiting pressure Pw to achieve the shorter waiting period Tw.

In a correction process M16, a hydraulic pressure command value P* is calculated by adding the correction amount ΔP to the hydraulic pressure command value P0*. In a current conversion process M18, the hydraulic pressure command value P* is converted into a current command value I* that is a command value of a current to flow through the solenoid valves 28a.

When the value of the gear ratio command value Vsft* changes, the control apparatus 40 switches a friction engagement element from the disengaged state to the engaged state by changing the current command value I* for the solenoid valve 28a of the friction engagement element that starts engagement based on the gear ratio command value Vsft* and the shifting variable ΔVsft.

Figure 5:
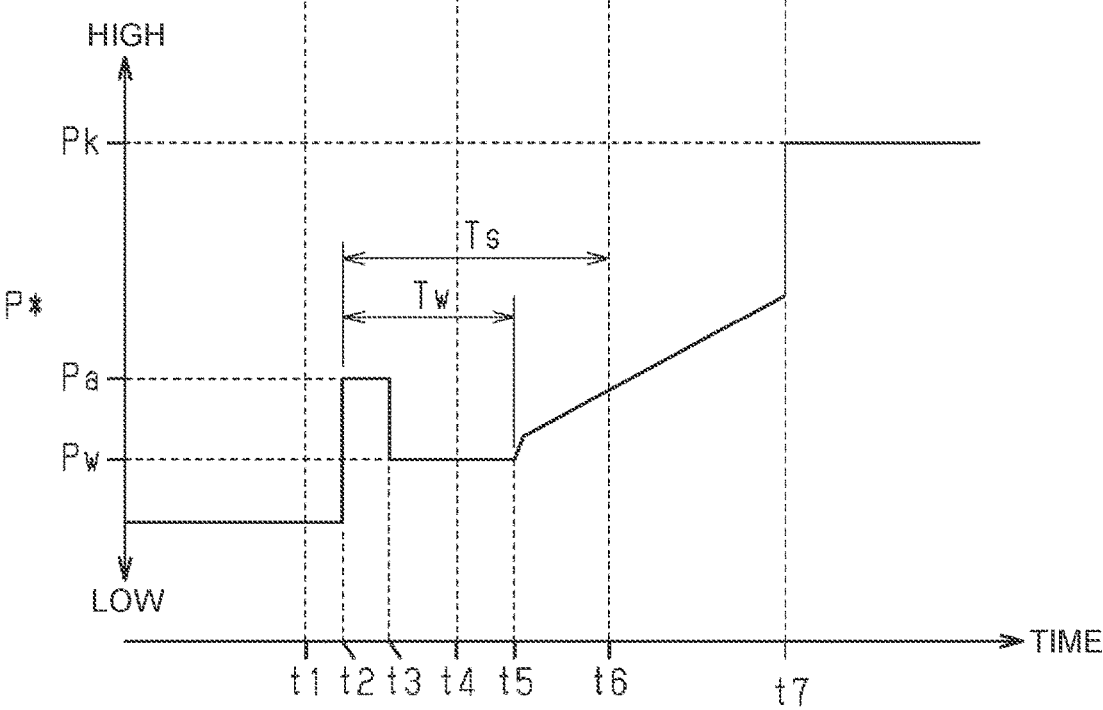
FIG. 5 is a time chart illustrating a change in a gear ratio command value during gear shifting in Portion according to the first embodiment.

FIG. 5 illustrates changes in various values during the gear shifting. Portion (A) of FIG. 5 illustrates a change in the gear ratio command value Vsft*. Portion (B) of FIG. 5 illustrates a change in the input shaft rotation speed Ni. Portion (C) of FIG. 5 illustrates a change in an output torque Trqout. Portion (D) of FIG. 5 illustrates a change in the hydraulic pressure command value P*.

As illustrated in FIG. 5, when the value of the gear ratio command value Vsft* changes at a time t1, calculation is started for the hydraulic pressure command value P* that is an instruction value of the hydraulic pressure to be supplied to the oil chamber 85 of a friction engagement element to be engaged during current gear shifting.

First, an application pressure Pa for quick application control is set as the hydraulic pressure command value P*. Therefore, the hydraulic pressure command value P* is temporarily increased to start hydraulic pressure supply to the oil chamber 85 (time t2). The quick application control is well-known control that is executed to temporarily increase the hydraulic pressure to promptly supply the hydraulic oil to a disengaged friction engagement element when engaging the friction engagement element. After the hydraulic pressure command value P* is set to the application pressure Pa for a specified period, the hydraulic pressure command value P* is reduced to the waiting pressure Pw (time t3).

When a specified period elapses from the start of the hydraulic pressure supply at the time t2 and determination is made that pack filling is completed (time t5), sweep control is executed to gradually increase the hydraulic pressure command value P* from the waiting pressure Pw. During the execution of the sweep control, an inertia phase is started, and the input shaft rotation speed Ni starts to change toward a synchronous rotation speed after the gear shifting (time t6).

When the input shaft rotation speed Ni reaches the synchronous rotation speed after the gear shifting, the hydraulic pressure command value P* is steeply increased to an engagement pressure Pk necessary to suppress a slip in the friction engagement element. Thus, the gear shifting is completed (time t7).

A torque phase is started at a time t4 that is a timing between the start of the hydraulic pressure supply at the time t2 and the completion of the pack filling at the time t5. Therefore, the output torque Trqout to be transferred to the output shaft 27out of the automatic transmission 26 starts to decrease. When the inertia phase is started at the time t6, the output torque Trqout starts to increase.

As illustrated in FIG. 5, the waiting period Tw is a period required from the hydraulic pressure supply to the oil chamber 85 to the completion of the pack filling, that is, a period from the time t2 to the time t5. At the time of completion of the pack filling after the start of the gear shifting (time t5), great changes are unlikely to appear in the input shaft rotation speed Ni and the output torque Trqout. Therefore, it is difficult to detect the completion of the pack filling based on the changes in the input shaft rotation speed Ni and the output torque Trqout. When the inertia phase is started in the process of the gear shifting (time t6), the input shaft rotation speed Ni changes greatly. Therefore, the start timing of the inertia phase can be detected easily. When the waiting period Tw increases, the start timing of the inertia phase is shifted later. That is, the waiting period Tw is correlated to a period Ts from the hydraulic pressure supply to the oil chamber 85 to the start of the inertia phase in the process of the gear shifting. Therefore, the control apparatus 40 of this embodiment measures the period Ts as a period variable indicating the waiting period Tw.

The control apparatus 40 executes a process for calculating the stroke amount ST of the piston 82, and a process for addressing a problem occurring in the calculated stroke amount ST. Those processes are described below.

Figure 6:
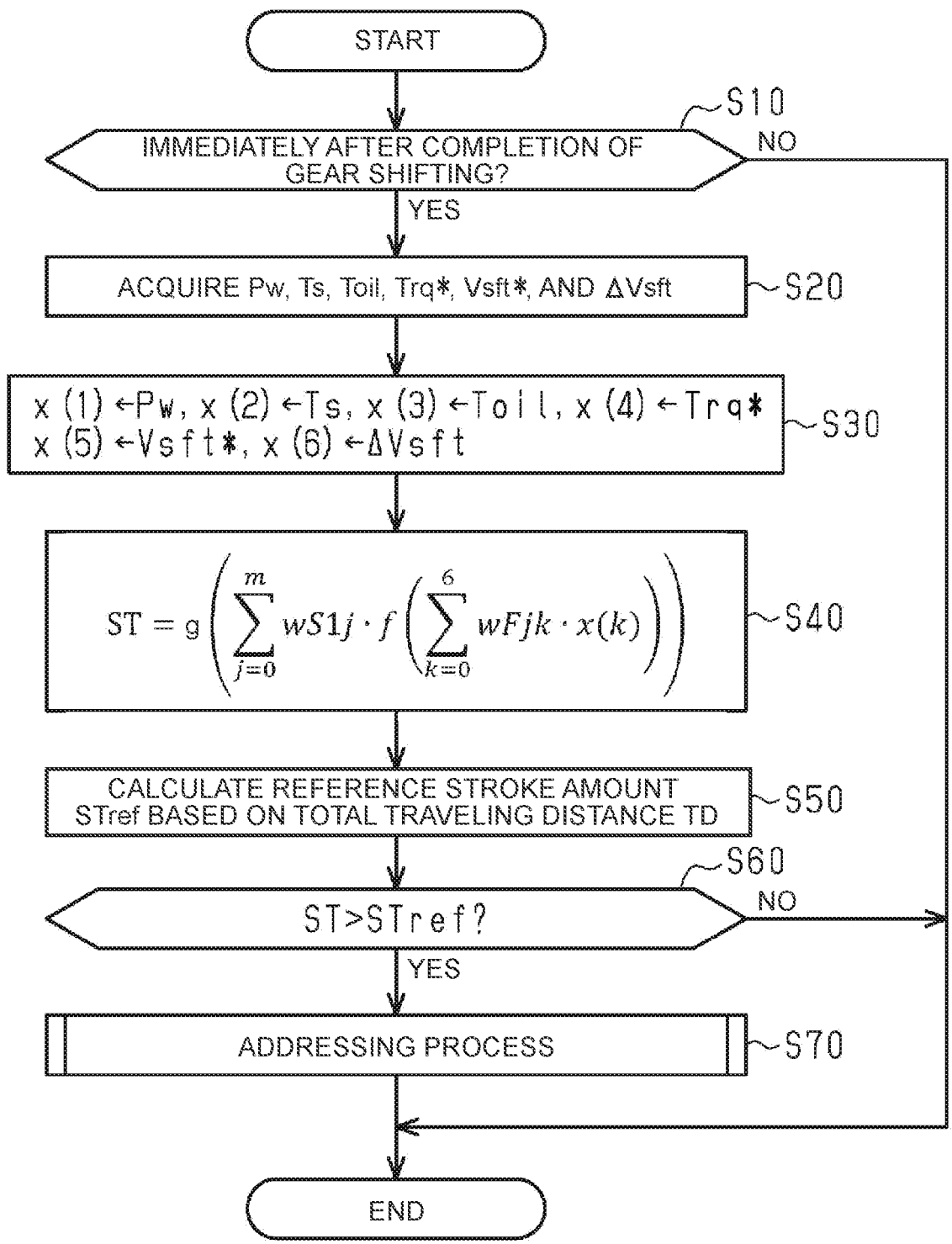
FIG. 6 is a flowchart illustrating a procedure of processes to be executed by the control apparatus according to the first embodiment.

FIG. 6 illustrates a procedure of processes to be executed by the control apparatus 40 according to this embodiment. The processes illustrated in FIG. 6 are implemented such that the CPU 42 repeatedly executes a program stored in the ROM 44 in, for example, every predetermined period. Step numbers of the processes are hereinafter represented by numerals prefixed with "S".

In a series of processes illustrated in FIG. 6, the CPU 42 first determines whether the timing is immediately after completion of gear shifting (S10). When the CPU 42 determines that the timing is not immediately after the completion of the gear shifting, the CPU 42 temporarily terminates the processes.

When the CPU 42 determines that the timing is immediately after the completion of the gear shifting, the CPU 42 executes an acquisition process for acquiring various values in the currently completed gear shifting (S20). Specifically, the CPU 42 acquires the waiting pressure Pw set as the hydraulic pressure command value P*, the period Ts, the oil temperature Toil, the driving torque command value Trq*, the gear ratio command value Vsft*, and the shifting variable ΔVsft. The values to be acquired are stored in the memory 46 during the gear shifting. In the process of S20, the values stored in the memory 46 are acquired. When the waiting pressure Pw, the oil temperature Toil, or the driving torque command value Trq* changes during a period from the start of the gear shifting to completion of pack filling, the CPU 42 may, for example, acquire values at the time of determination that the pack filling is completed, acquire maximum values of those values, or calculate and acquire averages of those values.

The CPU 42 substitutes the values acquired in the process of S20 for input variables of mapping defined by mapping data DM stored in the memory 46 illustrated in FIG. 1 (S30).

That is, the CPU 42 substitutes the waiting pressure Pw for an input variable x(1), the period Ts for an input variable x(2), the oil temperature Toil for an input variable x(3), the driving torque command value Trq* for an input variable x(4), the gear ratio command value Vsft* for an input variable x(5), and the shifting variable ΔVsft for an input variable x(6).

In this embodiment, the input variable x(1) is a pressure variable indicating the waiting pressure Pw. The input variable x(2) is a period variable indicating the waiting period Tw. The input variable x(3) is an oil temperature variable indicating a temperature of the hydraulic oil supplied to the oil chamber 85. The input variable x(4) is a torque variable indicating an output torque of an on-board prime mover. The input variable x(5) and the input variable x(6) are gear shifting variables indicating a friction engagement element engaged in the gear shifting.

The CPU 42 executes a calculation process for calculating a stroke amount ST of the friction engagement element in the currently completed gear shifting by substituting the input variables x(1), x(2), x(3), x(4), x(5), and x(6) into the mapping (S40).

In this embodiment, a function approximator is exemplified as the mapping. Specifically, a fully connected feedforward neural network having one intermediate layer is exemplified. More specifically, values of nodes in the intermediate layer are determined such that a bias parameter x(0) and the input variables x(1) to x(6) substituted by values through the process of S30 are converted by linear mapping defined by a coefficient wFjk (j=1 to m, k=0 to 6), and "m" values obtained through the conversion are substituted into an activation function f. Further, the stroke amount ST that is an output variable is determined such that the values of the nodes in the intermediate layer are converted by linear mapping defined by a coefficient wS1j, and individual values obtained through the conversion are substituted into an activation function g. In this embodiment, a hyperbolic tangent is exemplified as the activation function f, and a rectified linear unit (ReLU) function is exemplified as the activation function g.

The mapping data DM is a model trained before installed in the vehicle VC by using a vehicle having the same specifications as those of the vehicle VC or a power transmission apparatus including the internal combustion engine 10, the first motor generator 22, the second motor generator 24, the power split device 20, the automatic transmission 26, and the oil pump 32. That is, input variables obtained by variously setting the condition of the power transmission apparatus are acquired, and a stroke amount ST at that time is measured. Training data is generated in this manner, and the mapping data DM is trained based on the training data. When a difference between the value output from the mapping data DM and the value of the training data that are related to the stroke amount ST being the output variable is equal to or smaller than a predetermined value, determination is made that the training is completed, and the mapping data DM obtained as the trained model is stored in the memory 46.

The CPU 42 calculates a reference stroke amount STref based on a total traveling distance TD of the vehicle VC (S50). The total traveling distance TD is measured since the manufacture of the vehicle VC. The reference stroke amount STref is the following value.

That is, the wear amount of the friction members of the friction engagement element increases as the total traveling distance TD of the vehicle VC increases. Therefore, the stroke amount ST of the piston 82 increases. As indicated by a long dashed short dashed line L1 in FIG. 7, a limit value STL of the stroke amount ST that changes in response to the increase in the total traveling distance TD is determined in advance. A value obtained by subtracting a predetermined safety allowance a from the limit value STL is set as the reference stroke amount STref indicated by a long dashed double-short dashed line L2. The CPU 42 calculates a reference stroke amount STref associated with a current total traveling distance TD based on, for example, a map or a relational expression showing a preset correspondence between the reference stroke amount STref and the total traveling distance TD.

The CPU 42 determines whether the calculated stroke amount ST is larger than the reference stroke amount STref (S60). When the CPU 42 determines that the stroke amount ST is equal to or smaller than the reference stroke amount STref (S60: NO), the CPU 42 temporarily terminates the processes.

When the CPU 42 determines that the stroke amount ST is larger than the reference stroke amount STref (S60: YES), the CPU 42 executes an addressing process for reducing the wear of the friction members of the friction engagement element whose stroke amount ST is calculated in the process of S40 (S70), and temporarily terminates the processes.

The addressing process may be a process for shortening, when the friction engagement element whose stroke amount ST is calculated in S40 is engaged in the next or even later gear shifting, a period of relative rotation between the first plates 80$p$ and the second plates 81$m$ in the process of engagement. For example, when a period required from the start of engagement of the friction engagement element to the completion of the engagement is defined as an engagement period of the friction engagement element in this embodiment, a process for shortening the engagement period is executed by executing a process for increasing the rate of increase in the hydraulic pressure command value P* in the sweep control to be executed in the process of engagement.

Actions and effects of this embodiment are described.

(1) The stroke amount of the piston 82 increases as the friction members of the friction engagement element are worn. The stroke amount is correlated to the waiting period Tw. The waiting period Tw changes depending on the waiting pressure Pw as well as the stroke amount. In this embodiment, the period variable indicating the waiting period Tw and the pressure variable indicating the waiting pressure Pw that are related to the stroke amount are set as the input variables, and the stroke amount ST is calculated by inputting the input variables to the mapping defined by the mapping data DM. Therefore, the stroke amount of the piston 82 can be estimated accurately.

(2) When the temperature of the hydraulic oil changes, the fluidity of the hydraulic oil or the like changes and the moving speed of the piston 82 changes. Therefore, the waiting period Tw changes depending on the temperature of the hydraulic oil as well as the stroke amount. In this embodiment, the input variables include the oil temperature Toil serving as the oil temperature variable indicating the temperature of the hydraulic oil. Therefore, the stroke amount ST is calculated in consideration of influence on the waiting period Tw from the temperature of the hydraulic oil. Thus, the stroke amount ST can be calculated with higher accuracy than that in a case where the input variables do not include the oil temperature variable.

(3) In this embodiment, the waiting pressure Pw is variably set based on the output torque of the on-board prime mover. When the waiting pressure Pw is variably set based on the output torque, the waiting period Tw changes depending on the output torque as well as the stroke amount. In this embodiment, the input variables include the driving torque command value Trq* serving as the torque variable indicating the output torque of the on-board prime mover. Therefore, the stroke amount ST is calculated in consideration of influence on the waiting period Tw from the change in the waiting pressure Pw caused by the output torque. Thus, the stroke amount ST can be calculated with higher accuracy than that in a case where the input variables do not include the torque variable.

(4) The input variables include the gear ratio command value Vsft* and the shifting variable ΔVsft serving as the gear shifting variables indicating the friction engagement element engaged in the gear shifting. Therefore, the stroke amount ST of the friction engagement element engaged in the gear shifting can be calculated accurately.

(5) As described above, at the time of completion of the pack filling after the start of the gear shifting, great changes are unlikely to appear in, for example, the rotation speed of the input shaft 27in of the automatic transmission 26 and the output torque of the output shaft 27out of the automatic transmission 26. Therefore, it is difficult to detect the completion of the pack filling based on the changes in the rotation speed of the input shaft and the output torque. When the inertia phase is started in the process of the gear shifting, the input shaft rotation speed Ni of the automatic transmission 26 changes greatly. Therefore, the start timing of the inertia phase can be detected easily. When the waiting period Tw increases, the start timing of the inertia phase is shifted later. That is, the waiting period Tw is correlated to the period Ts from the hydraulic pressure supply to the oil chamber 85 to the start of the inertia phase in the process of the gear shifting. In this embodiment, the period Ts from the hydraulic pressure supply to the oil chamber 85 to the start of the inertia phase in the process of the gear shifting is acquired as the period variable indicating the waiting period Tw. Thus, the period variable can be acquired easily and securely.

Figure 7:
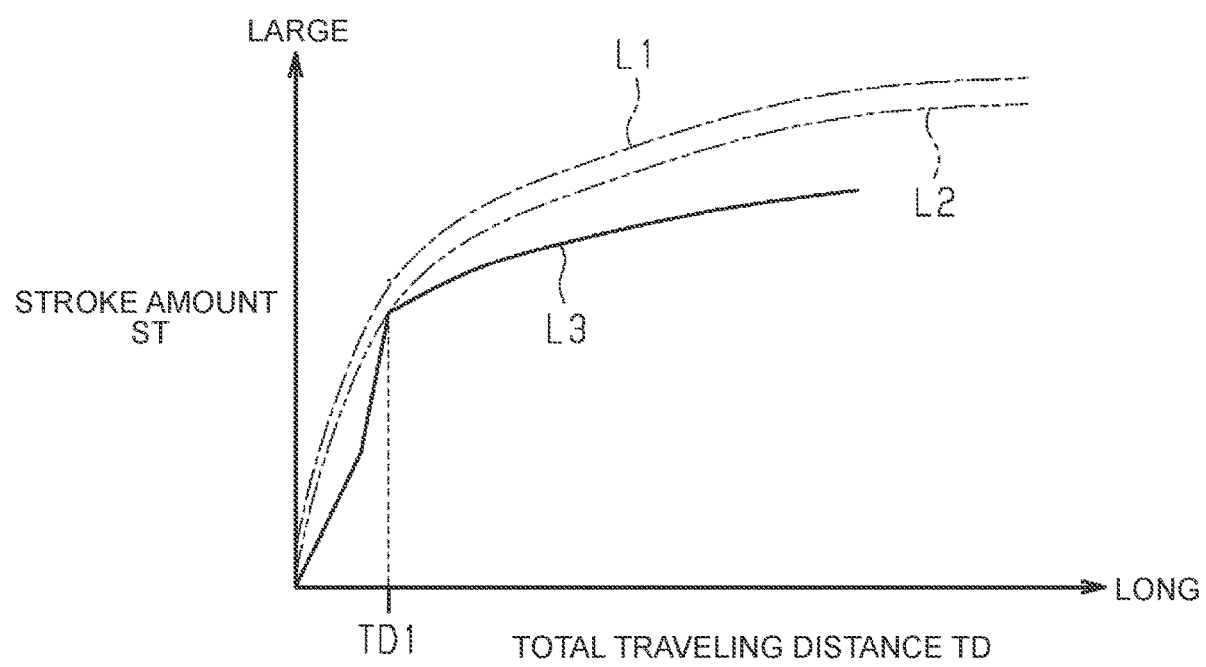
FIG. 7 is a graph illustrating a relationship between a total traveling distance and a stroke amount according to the first embodiment.

(6) When the stroke amount ST calculated through the calculation process is larger than the reference stroke amount STref calculated based on the total traveling distance TD of the vehicle VC (S60 of FIG. 6: YES), the addressing process is executed to reduce the wear of the friction members of the friction engagement element (S70). For example, the wear of the friction members is reduced after determination is made that the calculated stroke amount ST (indicated by a continuous line L3) is larger than the reference stroke amount STref calculated when the value of the total traveling distance TD reaches TD1 as illustrated in FIG. 7. Thus, an increase in the stroke amount along with an increase in the total traveling distance TD is suppressed. That is, the rate of the wear of the friction members decreases. Accordingly, it is possible to reduce the occurrence of, for example, a case where the friction members of the friction engagement element reach their serviceability limit at an early stage.

Second Embodiment

Figure 8:
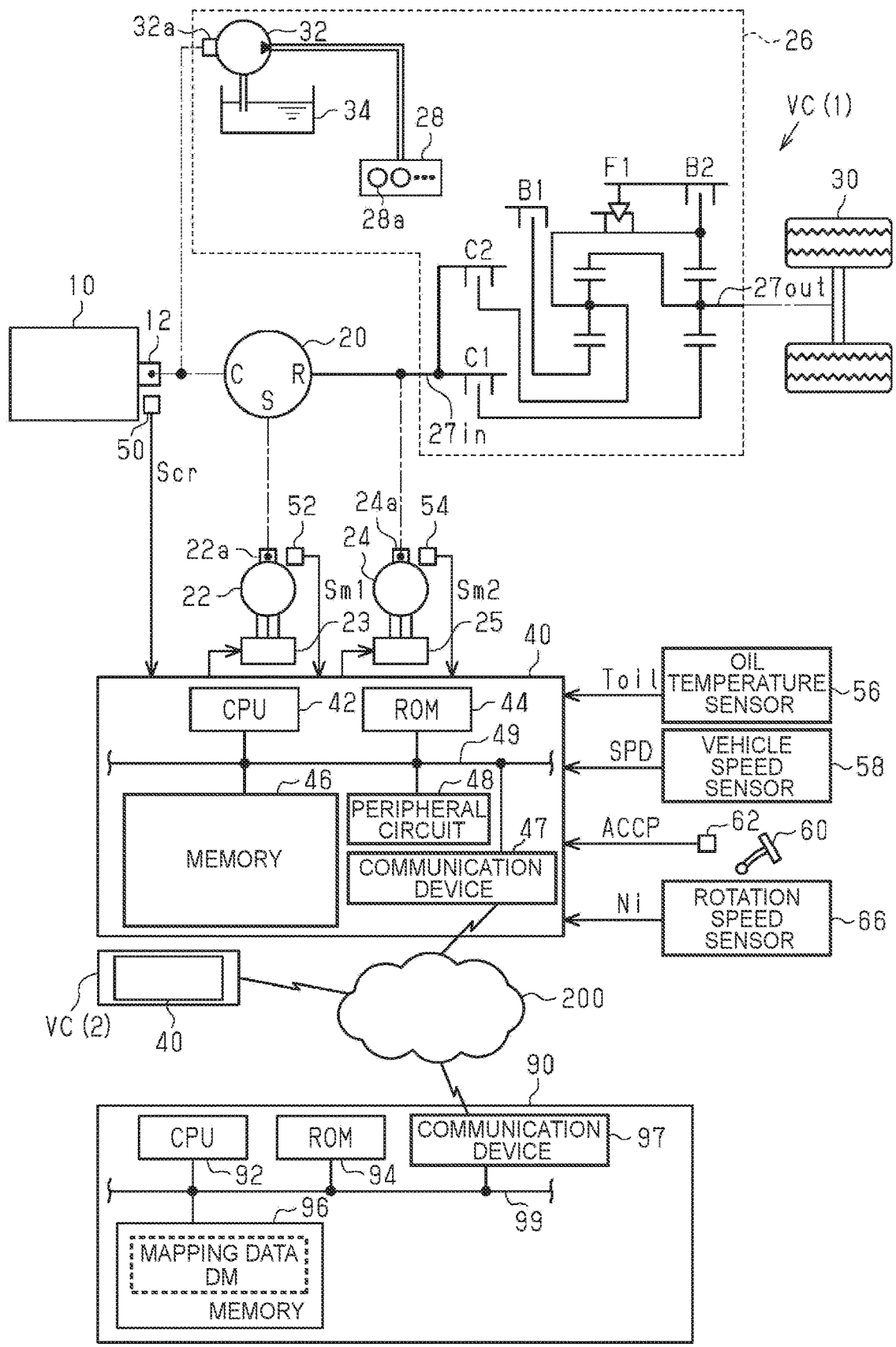
FIG. 8 is a diagram illustrating the configuration of a system according to a second embodiment.

Next, a second embodiment is described focusing on a difference from the first embodiment. FIG. 8 illustrates the configuration of a system according to this embodiment. In FIG. 8, members corresponding to the members illustrated in FIG. 1 are represented by the same reference symbols for convenience to omit their description.

As illustrated in FIG. 8, the control apparatus 40 of each of a vehicle VC(1) and a vehicle VC(2) includes a communication device 47. The communication device 47 is communicable with a data analysis center 90 via an external network 200. In this embodiment, the CPU 42 and the ROM 44 of the control apparatus 40 serve as a first processor.

The data analysis center 90 analyzes data transmitted from a plurality of vehicles VC(1), VC(2), . . . . The data analysis center 90 includes a CPU 92, a ROM 94, a memory 96, and a communication device 97, which are communicable with each other via a local network 99. The memory 96 is an electrically rewritable non-volatile memory, and stores the mapping data DM. In this embodiment, the CPU 92 and the ROM 94 serve as a second processor.

Figure 9:
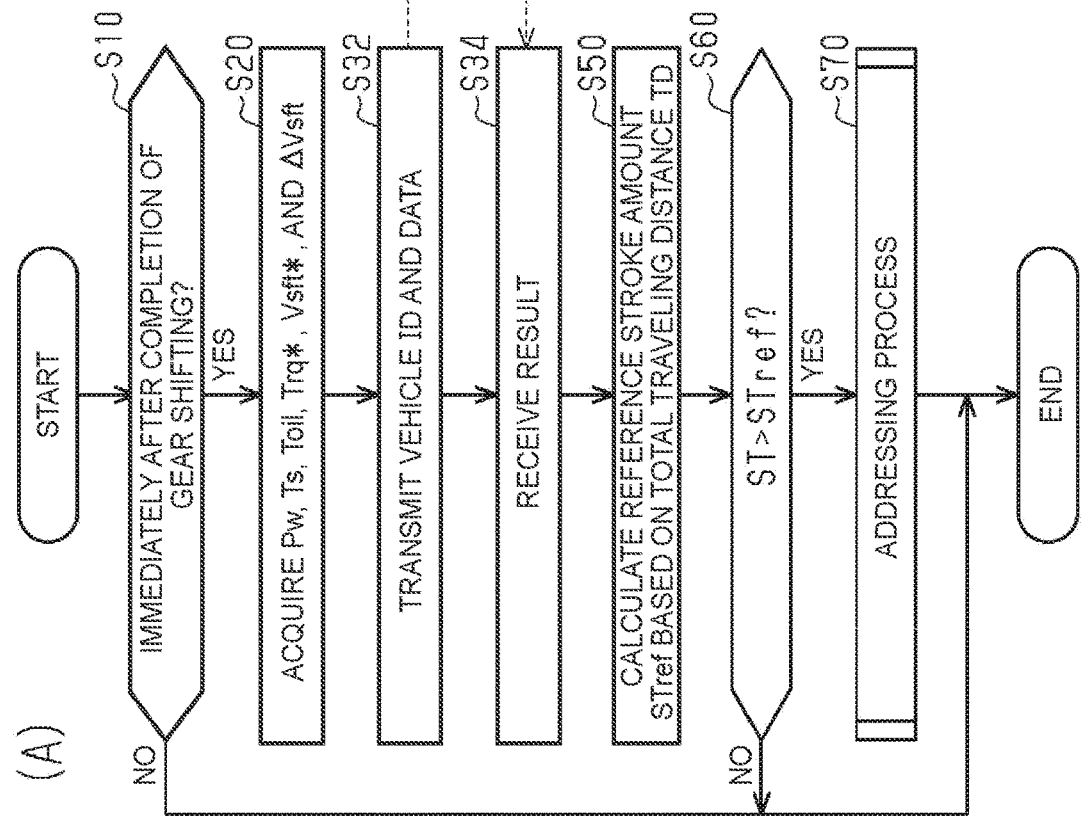
FIG. 9 is a flowchart illustrating, in Portion (A) and Portion (B), a procedure of processes to be executed by the system according to the second embodiment.

FIG. 9 illustrates a procedure of processes to be executed by the system illustrated in FIG. 8. The processes illustrated in Portion (A) of FIG. 9 are implemented such that the CPU 42 executes a program stored in the ROM 44. The processes illustrated in Portion (B) of FIG. 9 are implemented such that the CPU 92 executes a program stored in the ROM 94. In the processes illustrated in FIG. 9, processes corresponding to the processes illustrated in FIG. 6 are represented by the same step numbers for convenience to omit their description. A series of processes illustrated in FIG. 9 is described below along the time sequence of the processes related to the calculation of the stroke amount ST.

As illustrated in Portion (A) of FIG. 9, when the processes of S10 and S20 are completed, the CPU 42 operates the communication device 47 to execute a data transmission process for transmitting the data acquired in the process of S20 to the data analysis center 90 together with a vehicle identifier (ID) that is identification information of the vehicle VC (S32).

As illustrated in Portion (B) of FIG. 9, the CPU 92 of the data analysis center 90 executes a data reception process for receiving the transmitted data (S120). The CPU 92 substitutes, for example, the values acquired in the process of S120 for the input variables x(1) to x(6) of the mapping defined by the mapping data DM (S130). The process of S130 is equivalent to the process of S30 described above.

The CPU 92 executes the calculation process for calculating a stroke amount ST that is an output value of the mapping defined by the mapping data DM by inputting the input variables x(1) to x(6) to the mapping (S140). The process of S140 is equivalent to the process of S40 described above.

The CPU 92 operates the communication device 97 to execute a result transmission process for transmitting a signal related to a result of the calculation of the stroke amount ST to the vehicle VC that has transmitted the data received in the process of S120 (S150), and temporarily terminates the series of processes illustrated in Portion (B) of FIG. 9. As illustrated in Portion (A) of FIG. 9, the CPU 42 executes a result reception process for receiving the signal related to the result of the calculation of the stroke amount ST (S34). Then, the CPU 42 sequentially executes the processes of S50 and subsequent steps described above, and temporarily terminates the series of processes illustrated in Portion (A) of FIG. 9.

In this embodiment, the data analysis center 90 executes the processes of S130 and S140. Thus, a calculation load on the CPU 42 of the vehicle VC can be reduced as compared to a case where the CPU 42 executes the processes of S30 and S40 corresponding to the processes of S130 and S140.

The embodiments may be modified as follows. The embodiments and the following modified examples may be combined without causing any technical contradiction.

A process for calculating a wear amount AB of the friction members of the friction engagement element may be executed by subtracting an initial value STf of the stroke amount from the stroke amount ST calculated through the calculation process.

Figure 10:
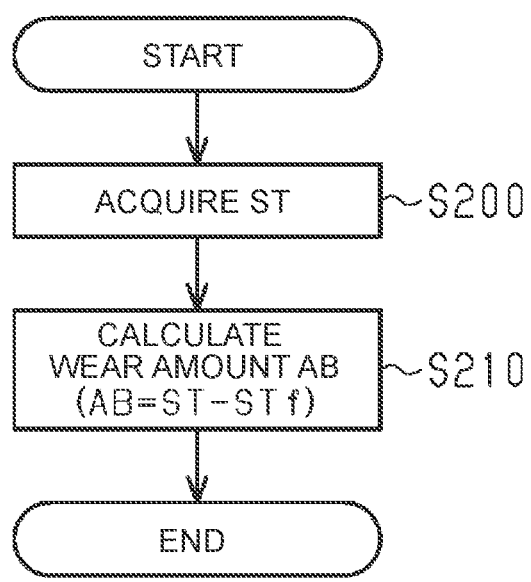
FIG. 10 is a flowchart illustrating a procedure of a process to be executed by the control apparatus in a modified example of the first embodiment.

FIG. 10 illustrates an example of a procedure of this process. The process illustrated in FIG. 10 is executed by the control apparatus 40. When this process is started, the CPU 42 acquires the stroke amount ST calculated through the process of S40 (S200). The CPU 42 calculates, as the wear amount AB, a value by subtracting the initial value STf of the stroke amount from the acquired stroke amount ST (S210), and temporarily terminates the process.

For example, a stroke amount ST calculated when the calculation process is executed for the first time or a design stroke amount ST of the friction engagement element in a brand new condition may be applied as the initial value STf of the stroke amount.

According to this modified example, the wear amount of the friction members can be calculated. The process illustrated in FIG. 10 may be executed by the CPU 92 of the data analysis center 90. The calculated wear amount AB may be contained in the data to be transmitted in the result transmission process.

The period Ts from the hydraulic pressure supply to the oil chamber 85 to the start of the inertia phase in the process of the gear shifting is acquired as the period variable, but the waiting period Tw may be acquired as the period variable if the waiting period Tw can be acquired.

The processes of S20 and subsequent steps are executed immediately after the completion of the gear shifting, but may be executed at other timings. The execution of the addressing process may be omitted.

A part of the correction process to be executed in the learning correction amount calculation process M14 may be omitted, or the learning correction amount calculation process M14 itself may be omitted. Among the input variables, at least one of the oil temperature variable, the torque variable, and the gear shifting variables may be omitted. Further, other variables related to the stroke amount may be added to the input variables.

The activation functions of the mapping are examples, and other functions may be employed. The neural network having one intermediate layer is exemplified as the neural network, but the neural network may have two or more intermediate layers.

The fully connected feedforward neural network is exemplified as the neural network, but the present disclosure is not limited to this case. For example, the neural network may be a recurrent neural network.

The function approximator serving as the mapping may be a regression equation. The regression equation corresponds to a neural network having no intermediate layer. The processor is not limited to the processor that includes the CPU 42 (92) and the ROM 44 (94) and executes the software process. For example, the processor may include a dedicated hardware circuit such as an application-specific integrated circuit (ASIC) configured to execute a hardware process in place of at least a part of the software process in the embodiments. That is, the processor may have one of the following structures (a) to (c).

(a) The processor includes a processing device configured to execute all the processes described above based on programs, and a program memory such as a ROM that stores the programs.

(b) The processor includes a processing device configured to execute a part of the processes described above based on programs, a program memory, and a dedicated hardware circuit configured to execute the remaining processes.

(c) The processor includes a dedicated hardware circuit configured to execute all the processes described above.

A plurality of devices or circuits may be provided as the software processor including the processing device and the program memory or as the dedicated hardware circuit.

The vehicle VC is not limited to the series-parallel hybrid vehicle. For example, the vehicle VC may be a series hybrid vehicle or a parallel hybrid vehicle. The on-board prime mover is not limited to the prime mover including the internal combustion engine and the motor generator. For example, the vehicle may have the internal combustion engine but need not have the motor generator. For example, the vehicle may have the motor generator but need not have the internal combustion engine.

What is claimed is:

1. An apparatus to be applied to a vehicle including a transmission configured to execute a gear shifting operation for changing a gear ratio between an on-board prime mover and a driving wheel by engaging or disengaging friction engagement elements having friction members pushed by a piston that moves through hydraulic pressure supply to an oil chamber, the apparatus comprising:
    a memory storing mapping data for defining mapping, the mapping including a pressure variable and a period variable as input variables, the mapping including a stroke amount as an output variable, the pressure variable indicating a waiting pressure, the period variable indicating a waiting period, a hydraulic pressure supplied to the oil chamber for pack filling to bring the disengaged friction engagement elements into a state immediately before engagement being defined as the waiting pressure, a movement amount of the piston during a period from the hydraulic pressure supply to the oil chamber to completion of the pack filling is defined as the stroke amount of the piston, the period required from the hydraulic pressure supply to the oil chamber to the completion of the pack filling is defined as the waiting period; and
    a processor configured to execute steps of:
        acquiring values of the input variables, and
        calculating a value of the output variable by inputting, to the mapping, the acquired values of the input variables, and
        reducing wear of the friction members when the stroke amount calculated by the processor is larger than a reference stroke amount calculated based on a total traveling distance of the vehicle,
        wherein the step of reducing wear of the friction members includes shortening an engagement period of relative rotation between first plates and second plates of the friction members.

2. The apparatus according to claim 1, wherein the input variables include an oil temperature variable indicating a temperature of hydraulic oil supplied to the oil chamber.

3. The apparatus according to claim 1, wherein the waiting pressure is a pressure to be changed to increase as an output torque of the on-board prime mover increases, and the input variables include a torque variable indicating the output torque.

4. The apparatus according to claim 1, wherein the transmission includes a plurality of the friction engagement elements, and
    the input variables include a gear shifting variable indicating the friction engagement elements engaged in gear shifting.

5. The apparatus according to claim 1, wherein a period from the hydraulic pressure supply to the oil chamber to a start of an inertia phase in a process of gear shifting is acquired as the period variable.

6. The apparatus according to claim 1, wherein the processor is further configured to execute a step of calculating a wear amount of the friction members by subtracting an initial value of the stroke amount from the stroke amount calculated by the processor.

7. The apparatus according to claim 1, wherein shortening the engagement period includes executing a process for increasing a rate of increase in the hydraulic pressure in a sweep control to be executed in the engagement period.

8. A system comprising:
    a memory storing mapping data for defining mapping, the mapping including a pressure variable and a period variable as input variables, the mapping including a stroke amount as an output variable, the pressure variable indicating a waiting pressure, the period variable indicating a waiting period, in a vehicle including a transmission configured to execute a gear shifting operation for changing a gear ratio between an on-board prime mover and a driving wheel by engaging or disengaging friction engagement elements having friction members pushed by a piston that moves through hydraulic pressure supply to an oil chamber, a hydraulic pressure supplied to the oil chamber for pack filling to bring the disengaged friction engagement elements into a state immediately before engagement being defined as the waiting pressure, a movement amount of the piston during a period from the hydraulic pressure supply to the oil chamber to completion of the pack filling is defined as the stroke amount of the piston, the period required from the hydraulic pressure supply to the oil chamber to the completion of the pack filling is defined as the waiting period;
    a first processor provided in the vehicle; and
    a second processor provided outside the vehicle,
    wherein the first processor is configured to execute steps of:
        acquiring values of the input variables,
        transmitting acquired data,
        receiving a result of calculation from the second processor, and
        reducing wear of the friction members when the stroke amount calculated by the second processor is larger than a reference stroke amount calculated based on a total traveling distance of the vehicle, and
    the second processor is configured to execute steps of:
        receiving data transmitted by the first processor,
        calculating, as the result of calculation, a value of the output variable by inputting, to the mapping, the acquired values of the input variables, and
        transmitting the result of calculation, and
    the step of reducing wear of the friction members includes shortening an engagement period of relative rotation between first plates and second plates of the friction members.

9. The system according to claim 8, wherein shortening the engagement period includes executing a process for increasing a rate of increase in the hydraulic pressure in a sweep control to be executed in the engagement period.

10. A vehicle control apparatus comprising a first processor configured to execute steps of:
    acquiring values of input variables,
    transmitting acquired data, and
    receiving a result of calculation from a second processor, and
    reducing wear of friction members when a stroke amount calculated by a second processor is larger than a reference stroke amount calculated based on a total traveling distance of a vehicle,
    wherein the step of reducing wear of the friction members includes shortening an engagement period of relative rotation between first plates and second plates of the friction members.

11. The vehicle control apparatus according to claim 10, wherein shortening the engagement period includes executing a process for increasing a rate of increase in the hydraulic pressure in a sweep control to be executed in the engagement period.

\* \* \* \* \*